(No Model.)
W. S. MENDENHALL.
DAMPING APPARATUS FOR PRESS COPYING.
No. 523,642. Patented July 24, 1894.
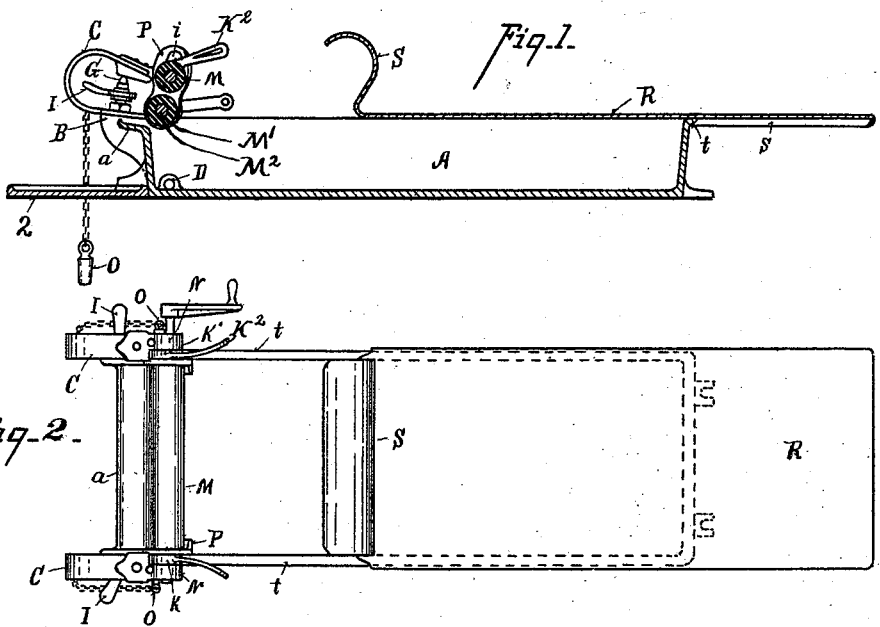
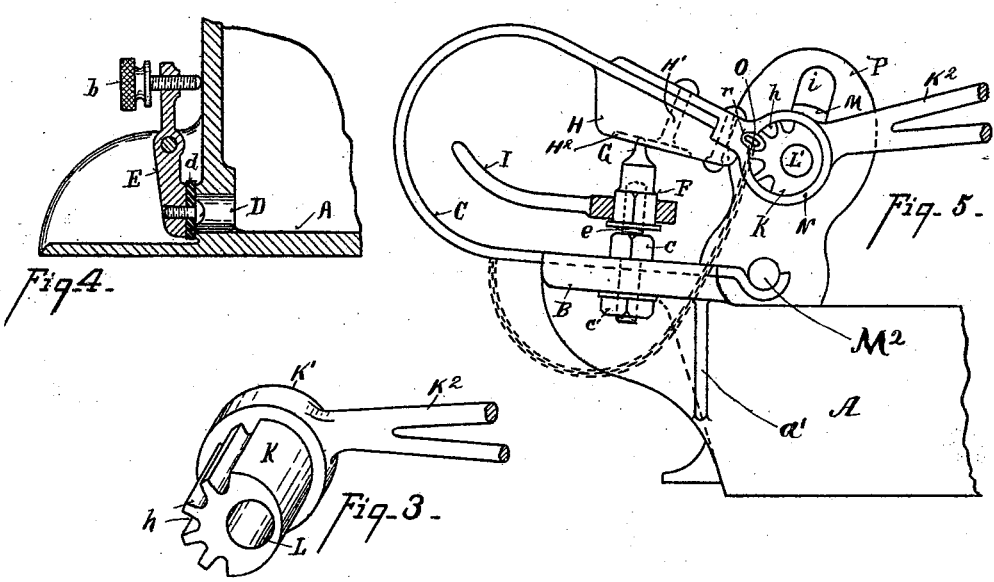
Attest—
C. W. Miles
Oliver B. Kaiser
Inventor—
Walter S. Mendenhall
By Woods Boyd
attys

UNITED STATES PATENT OFFICE.

WALTER S. MENDENHALL, OF COVINGTON, KENTUCKY, ASSIGNOR TO THE SAML. C. TATUM COMPANY, OF CINCINNATI, OHIO.

DAMPING APPARATUS FOR PRESS-COPYING.

SPECIFICATION forming part of Letters Patent No. 523,642, dated July 24, 1894.

Application filed January 3, 1894. Serial No. 495,536. (No model.)

*To all whom it may concern:*

Be it known that I, WALTER S. MENDENHALL, a citizen of the United States, residing at Covington, in the county of Kenton and State of Kentucky, have invented certain new and useful Improvements in Dampening Apparatus for Press-Copying, of which the following is a specification.

The object of my invention is to provide a new and improved damping apparatus for press copying, of such construction that sheets may be moistened and then wrung or compressed in the proper manner to remove the surplus water.

To accomplish this object my invention consists in the features of construction and the combination or arrangement of devices hereinafter described and claimed, reference being made to the accompanying drawings, in which—

Figure 1 is a central, longitudinal section of my improvement. Fig. 2 is a top plan view of Fig. 1. Fig. 3 is a detail view of the spring regulating device. Fig. 4 is a sectional elevation of the draw-off valve. Fig. 5 is an end elevation of the tank and wringer, partly in section, the drip-table being omitted.

A represents the tank preferably made of cast metal. B represents knee brackets cast upon the forward end of said tank preferably having strengthening ribs as at $a'$ and elevated above the drip table $a$.

C represents U-shaped springs of a sheet-wringer, which are rigidly secured at one end to the knee-brackets B.

D represents an orifice in one corner of the tank. E a pivot flap valve; $b$ a set screw tapping through the stem of the valve and bearing against the side of the tank.

$d$ represents a packing on the face of the valve resting against the outer walls of the orifice. The valve is opened by turning the set screw $b$. The use of this valve allows the water to be drawn off without danger of clogging the orifice with the lint from the sheets, which occurs when a faucet is used.

Between the arms or members of the springs C are located devices for limiting the downward motion of the upper arms or members of the springs. Each of these devices is composed of a nut F engaging a bolt $e$ which passes through a spring C, and is secured to a knee-bracket B through the medium of nuts $c$ and $c'$. The nut F is provided with a pointed cap or dome G, the point of which seats in a recess or cavity $H^2$ formed in the under side of a plate H which is rigidly secured to the upper arm or portion of the spring by rivets or other suitable fastening devices H'. The nut F is provided with an angular portion engaged by a wrench I, so that the nut can be turned on a screw-bolt $e$, whereby the nut will be raised or lowered according to the direction in which it is turned.

The tension of the springs is regulated by devices which I will now describe: The end portion of the upper arm or member of each spring C is provided with a ring N, and the upper wringer-roller M is provided with a shaft L' arranged in a bore L formed eccentrically in a longitudinally fluted eccentric K having a circular head K' at one end adapted to rest against one of the upright end plates P. The shaft L' of the wringer-roller M extends through a curved slot $i$ in the plate P, and the circular head K' of the eccentric K is provided with a suitable handle $K^2$, in such manner that by rotating the eccentric on the shaft L', the end of the spring C having the ring N will be more or less raised or lowered, according to the direction in which the handle $K^2$ is swung or moved. If the handle $K^2$ be moved downward, the ring N will be raised, and conversely, if the handle $K^2$ be moved upward the ring N will be lowered, and, therefore the tension of the spring C will be varied to suit the conditions required.

Each of the springs C is provided with a ring N and tension adjusting devices of the character described, and a description of one is deemed sufficient for both. The ring N is provided with a notch or recess $r$, so that a pin O may be inserted into the notch and enter one of the flutes $h$ of the eccentric K, thereby locking the latter rigidly to the ring, and holding the eccentric in the position to which adjusted.

The adjustable nuts F with their pointed caps or domes G serve to limit the downward movement of the upper arms or members of the springs C, so that the wringer-rolls cannot press the sheets too tightly, as this would make them too dry for perfect work.

R represents a cover for the tank, the forward end of which is provided with a curved apron S adapted to cover over the rolls; the top of the tank is provided with an overhanging lip t, and the cover is provided with a conversely overhanging lip s, which form ways to hold the cover in position and allow it to slide back and forth on the top of the tank. By this means the tank and the upper and lower wringer rollers M and M' are both kept covered by the same appliance and it prevents undue evaporation of the water and the collection of dust in the tank, and keeping the parts neat and clean; and is readily slipped off when used.

The shaft M², Fig. 5, of the lower wringer roller M', Fig. 1, is mounted in bearings in the lower arms or members of the springs C.

In Fig. 1 I have shown a cast apron 2 arranged in front of tank A to recive the cloths as they fall from the wringer.

Having described my invention, what I claim is—

1. The combination with a copying-tank of knee-brackets B rigidly secured to one end portion thereof, the U-shaped spring C attached at one end to the said brackets, the wringer-rollers one of which is supported by the springs, an adjustable nut for limiting the downward motion of the upper wringer-roll, and tension regulating devices engaging the ends of the upper arms of the springs for adjusting the same to different positions and varying the tension of the springs, substantially as described.

2. The combination with a copying-tank A having a drip-table a, of knee-brackets B rigidly secured to the end of the tank having the drip-table, the U-shaped springs C rigidly secured to the said brackets, wringer-rolls one of which is carried by the upper arms or members of the springs, vertically adjustable nuts supported by the said brackets for limiting the downward motion of the upper arms or members of the springs, and eccentrics arranged on the shaft of the upper wringer-roll and engaging the upper arms or members of the springs for raising or lowering the same to vary the tension of said springs, substantially as described.

3. The combination with a copying-tank, of U-shaped springs arranged on the tank and having their upper arms or members provided with rings N, wringer-rolls the upper one of which is provided with a shaft L', and eccentrics K journaled on the shaft of the upper wringer-roll, arranged in the rings of the said springs and provided with handles K², substantially as described.

4. The combination with a copying-tank A, of U-shaped springs mounted thereupon and having their upper arms or members provided with rings N, vertically slotted plates P, wringer-rolls the upper one of which is provided with a shaft L' extending through the slots in the said plates, eccentrics K mounted on the shaft of the upper wringer-roll and extending into the rings of the springs, and means for rotating the eccentrics on the shaft of the upper wringer-roll, substantially as described.

5. The combination with a copying tank, of the U-shaped springs rigidly connected with the tank and having the free ends of their upper portions provided with rings N, the upper and lower wringer rollers M and M', the eccentrics K arranged in the said rings and journaled on the shaft of the upper wringer roller, means for rotating the said eccentrics on the said shaft, and means for limiting the upward motion of the arms of the springs which carry the eccentrics, substantially as described.

6. In combination with the copying tank A, having the bracket B, the U-shaped wringer roller springs C, each having an eye N attached to the free end of the spring arm, the eccentric journal K, the flutes H, and the lock pin O, substantially as described.

In testimony whereof I have hereunto set my hand.

WALTER S. MENDENHALL.

Witnesses:
T. SIMMONS,
W. R. WOOD.